United States Patent [19]

Hodson

[11]  4,269,724

[45]  May 26, 1981

[54] COMPOSITION FOR PAINT STRIPPER

[76] Inventor: James V. Hodson, 1650 E. 500 South, Fruit Heights, Utah 84037

[21] Appl. No.: 121,304

[22] Filed: Feb. 13, 1980

[51] Int. Cl.$^3$ ............................ C11D 7/50; C23G 5/02
[52] U.S. Cl. .................................... 252/171; 252/144; 252/162; 252/163; 252/168; 252/170; 252/172; 252/DIG. 8; 106/271; 134/38; 134/39
[58] Field of Search ............... 252/144, 162, 163, 168, 252/171, 170, 172, DIG. 8; 106/271; 134/38, 39

[56] References Cited

U.S. PATENT DOCUMENTS

| | | | |
|---|---|---|---|
| 3,979,219 | 9/1976 | Chang et al. | 134/38 X |
| 3,983,047 | 9/1976 | Vinson | 252/DIG. 8 X |
| 3,988,256 | 10/1976 | Vandermey et al. | 252/DIG. 8 X |

Primary Examiner—Mayer Weinblatt
Attorney, Agent, or Firm—Harvey B. Jacobson

[57] ABSTRACT

A paint stripper composition able to remove a variety of paint systems employing methylene chloride as the active solvent for the composition further includes an amine-glycolate acid salt having a pH of 5 which aids in the swelling of the subsurface of the paint system that is to be removed, thus allowing the permeation of salt complex in conjunction with the chloride ion portion of the methylene chloride to cause a releasing action of the paint bond from the substrate material such as metal, wood, glass, fabric or plastic. The composition further includes a vapor pressure depressant such as paraffin wax, a viscosity increasing agent, and other solvent materials to aid in the stripping action. The composition is substantially totally bio-degradable, is low in toxicity and is further characterized by the variety of paint systems which can be effectively removed by the composition and its ability to remove carbon deposits on metal parts and surface rust from metal and chrome plated surfaces.

8 Claims, No Drawings

COMPOSITION FOR PAINT STRIPPER

BACKGROUND OF THE INVENTION

1. Field of the Invention

The present invention relates to a paint stripper composition effective in removal of a wide variety of paint systems coated or otherwise adhered to such substrates as metal, wood, glass, fabric or plastic. The composition of the present invention has been found effective in the removal of such finishes as acrylic nitrocellulose lacquers, amide cured epoxy systems, polyurethane systems, polysulfide systems, varnish systems, lacquer systems, enamel systems, and the like, and has further been found to be effective in the removal of carbon deposits found on metal parts and has unique chelating and sequestering properties effective to remove surface rust from metal and chrome plated surfaces.

2. Disclose Statement

Finish remover compositions comprising methylene chloride as the active solvent have tradionally been formulated either an acid or basic pH level depending upon the type of surface upon which the finish has been applied. Since the stripper compositions have been formulated to be effective for only a specific substrate on which the finish is applied, prior art removers have a somewhat limited value and cannot be effectively used to remove finishes from substrates for which the remover composition was not formulated. For example, U.S. Pat. No. 3,979,219, issued Sept. 7, 1976 to Chang et al, discloses an acidic wood finish remover consisting essentially of a mixture of hydroxyacetic acid in methylene chloride solution. The finish remover composition of this patent is formulated to be effective as a wood finish remover and according to the patent maintains whiteness of the wood surface, and does not stain or darken the surface, such as frequently occurs when alkaline or neutral finish removers are applied to old wood surfaces. Many paint stripper compositions are formulated to remove a particular type of finish such as U.S. Pat. No. 3,138,557, issued June 23, 1964, in which an acid base paint stripper is formulated to remove epoxy resin systems. In this patent, methylene chloride is combined with hypophosphorous acid and water. Basic finish remover systems are also known consisting of sodium hydroxide or trisodiumphosphate in water. Another composition employing methylene chloride as an active solvent includes U.S. Pat. No. 3,988,256, issued Oct. 26, 1976, as a rinsing composition for removing a photoresist stripper and comprising methylene chloride and a lower alkyl alcohol. A finish remover including an ethanol amine is disclosed in U.S. Pat. No. 1,829,583, issued Oct. 27, 1931, the amine used in conjunction with ethyl benzene as the active solvent.

The paint stripper composition of the present invention is an improvement over prior art removers in that the remover is not formulated to remove a particular type of finish or to be used on a specific substrate, but is unique in that it can remove a wide variety of finishes and is effective on a wide variety of substrate materials.

SUMMARY OF THE INVENTION

Briefly, the composition of the present invention employs methylene chloride as the active solvent for the formulation and for softening and otherwise attacking the finish to be removed causing a releasing action of the paint bond from the surface. Along with the methylene chloride solvent is used iso-propyl alcohol which has a relatively low toxicity when compared with methanol which is conventionally used with methylene chloride in paint stripper formulations. To the methylene chloride and iso-propyl alcohol solvent system is added mono-ethanolamine and glycolic acid (hydroxyacetic acid) to create an amine-glycolate acid salt that has a pH level of about 5. This amine-acid salt imparts the best qualities of an acid activated and a base activated stripper composition and along with the other solvent materials aid in the releasing action of the paint finish from the surface of the substrate, and further enables the stripper composition to be effective in the removal of a wide variety of finishes from any particular substrate. The amine-acid salt of the invention also imparts to the paint stripper composition chelating and sequestering properties along with paint removal and carbon removal properties to provide for the removal of surface rust from metal and chrome-plated surfaces. The composition further includes a vapor pressure depressant for the purpose of retarding the rate of evaporation of methylene chloride from the solution. The composition can be applied to substrates by any known coating technique. For the solution to be applied by brush or any application method requiring a more viscous material for effective removal of the finish, a thickening agent such as a derivative of methylcellulose may be employed.

Accordingly, it is an object of the present invention to provide an improved finish remover which is effective to remove a wide variety of paint systems from substrate materials.

It is another object of the invention to provide a paint stripper composition which is effective to remove finishes from a wide variety of substrate materials.

It is still another object of the present invention to provide a paint stripper composition which is based upon a solution of methylene chloride and iso-propyl alcohol and contains an amine-glycolate acid salt which enables the composition to be an effective paint remover regardless of the finish to be removed and the substate material onto which the finish is adhered.

It is yet a further object of the present invention to provide a paint stripper composition which is also effective to remove carbon deposits found on metal parts.

It is yet a further object of the present invention to provide a paint stripper composition which contains methylene chloride as an active solvent and contains an amine-acid salt effective to impart chelating and sequestering properties to the composition to enable the composition to remove surface rust from metal and chrome-plated surfaces.

Other and further objects of the present invention will become apparent to those skilled in the art upon a study of the following specification and appended claims.

DETAILED DESCRIPTION OF THE INVENTION

The paint stripper composition of the present invention contains a major amount of methylene chloride as the active solvent and further includes a smaller proportion of iso-propyl alcohol in combination with the methylene chloride, the combined solvents functioning to penetrate and cause the finish to swell or expand and thus detach itself from the surface to which it is applied. The addition of mono-ethanol amine and glycolic acid in a ratio of 1:1.5-3 parts to form an amine-glycolate acid salt that has a pH level of about 5 has an efficient activating affect on the penetrating and softening action of the active solvents by assisting the methylene chloride to pass through the coating and cause a releasing action of the paint bond from the substrate surface, the amine-acid salt complex also appears to have a bond releasing function.

The following composition was prepared in accordance with the teachings of the present invention:

TABLE 1

| COMPONENT | AMOUNT |
|---|---|
| Methylene chloride | 68% (by weight) |
| Isopropyl alcohol | 23% (by weight) |
| METHOCEL | 1% (by weight) |
| Mono-ethanolamine | 2% (by volume) |
| Paraffin wax (M.P. 128-132° F.) | 1% (by weight) |
| A 70% solution of glycolic acid in water | 5% (by volume) |

The materials are added and mixed in the order given in the Table from top to bottom. This particular process of introducing the basic constituents of the invention provides superior results. Although other orders of introduction may be utilized without departing from the scope of the present invention, a different order of adding the ingredients yields finished products of an inferior quality both in product appearance and remove capacity.

The heat of reaction when incorporating the acid portion of the formula creates a clear product when the final agitation is completed. The agitation period is about 30 minutes. The mixed ingredients form a solution which can be applied to almost any substrate by rolling, spraying, brushing, dipping, etc.

The above compositon is effective in the removal of a wide variety of finishes as shown in Table II.

TABLE 2

| 1. Acrylic nitrocellulose lacquers | Removel Time | 15 minutes |
|---|---|---|
| 2. Amid cured epoxy systems | Removel Time | 30 minutes |
| 3. Polyurethane systems | Removel Time | 10 minutes |
| 4. Polysulfide systems | Removel Time | 5 minutes |
| 5. Varnish systems | Removel Time | 10 minutes |
| 6. Lacquer systems | Removel Time | 10 minutes |
| 7. Enamel systems | Removel Time | 5 |

In order to define the features of the invention, the following discussion and the features of the components is provided

METHYLENE CHLORIDE

Methylene chloride functions as the principal solvent for the finish to be removed, and it is also the principal component of the present composition. The presence of iso-propyl alcohol appears to enhance the solvent capability of methylene chloride, thus achieving a synergistic effect or action between these two components.

ISO-PROPYL ALCOHOL

Iso-propyl alcohol is incorporated in the solution to assist in the stripping action. Compared with methonal, this solvent has relatively low toxicity and can be used in amounts of about one part to about 3 parts by weight per part of methylene chloride.

AMINE-GLYCOLATE ACID SALT

As has been set forth, this material is formed by the addition of mono-ethanol amine and glycolic acid in proportions so as to provide a pH level of about 5. This amine-acid salt imparts the multi-spectrum paint system remover properties of the composition of the present invention and enables its use with a wide variety of substrates without harming the appearance of the substrate material. The amine-acid salt is bio-degradable to the extent of 98% and as such is not an environmental hazard as is the case with conventional paint stripper compositions.

The utilization of the amine-glycolate acid salt enables the paint stripper composition to remove carbon deposits found on metal parts and imparts chelating and sequestering properties to the composition for removal of surface rust from metal and chrome-plated surfaces. Unlike other prior art systems which rely on very basic or acidic compositions, the amine-acid salt of the present invention provides for a substantially neutral pH which enables the composition to be used on a wide variety of materials and substrates and yet still provide excellent removing action.

VAPOR PRESSURE DEPRESSANT

The paraffin wax is provided in order to reduce the evaporative losses of methylene chloride in the working solutions. The paraffin wax employed has a melting point of between about 128°-132° F. and can be used in amounts of about 1-5% by weight. A non-toxic solvent may be utilized to incorporate the paraffin wax into the composition. One such solvent is Stoddard solvent.

THICKENING AGENT

The thickening agent is a derivative of methylcellulose. The preferred material is METHOCEL, a trade name for an hydroxypropylmethylcellulose. This material is used as a viscosity increasing agent to provide an appropriate consistency to the paint stripper for easy application. This material can be added to amounts of about 1 to about 10% by weight.

While particular embodiments of the invention have been described for the purpose of illustration, it should be understood that various modifications and adaptations thereof may be made within the spirit of the invention as set forth in the appended claims.

What is claimed as new is as follows:

1. A finish remover composition comprising methylene chloride and iso-propyl alcohol as active solvents, said methylene chloride and iso-propyl alcohol being present in a weight ratio of about 3:1 and an amine-glycolate acid salt formed by the addition of about 2% by volume mono-ethanolamine and about 5% by volume of a water-glycolic acid mixture based on the volume of the composition so as to form a pH of about 5.

2. The composition as set forth in claim 1 further including about 1 to about 5% by weight paraffin wax as a vapor pressure depressant.

3. The composition as set forth in claim 2 wherein said water-glycolic acid mixture is a 70% solution by volume of glycolic acid in water.

4. The composition as set forth in claim 3 wherein said composition further includes a thickening agent in amounts of about 1 to about 10% by weight.

5. The composition as set forth in claim 4 wherein said thickening agent is hydroxypropylmethylcellulose.

6. A method of formulating a paint remover composition effective in removing a wide variety of finishes from a substrate comprising adding and mixing the following ingredients in order:
 (1) methylene chloride;
 (2) about 1 part by weight isopropyl alcohol to about every 3 parts by weight methylene chloride;

(3) 2% by volume based on said composition of mono-ethanol amine;
(4) an effective amount of paraffin wax to prevent evaporation of the volatile solvents; and
(5) 5% by volume based on said composition of a water-glycolic acid mixture to create an amine-glycolate acid salt that has a pH of about 5; and
(6) mixing for about 30 minutes until a clear product is obtained.

7. A finish remover composition comprising methylene chloride as an active solvent, further including an amine-glycolate acid salt formed by reaction of about 2% by volume of said solvent of mono-ethanolamine and about 5% by volume of a water-glycolic acid mixture, the amine-glycolate acid salt having a pH of about 5.

8. The composition as set forth in claim 7 wherein said water-glycolic acid mixture comprises about 70% by volume glycolic acid in water.

* * * * *